(12) United States Patent
Benedetti

(10) Patent No.: US 9,357,799 B2
(45) Date of Patent: Jun. 7, 2016

(54) APPARATUS FOR SEPARATING AGRICULTURAL PRODUCTS

(71) Applicant: UNITEC S.P.A., Lugo (RA) (IT)

(72) Inventor: Luca Benedetti, Savarna (IT)

(73) Assignee: UNITEC S.P.A., Lugo (RA) (IT)

( * ) Notice: Subject to any disclaimer, the term of this patent is extended or adjusted under 35 U.S.C. 154(b) by 0 days.

(21) Appl. No.: 14/411,031

(22) PCT Filed: May 23, 2013

(86) PCT No.: PCT/IB2013/054267
§ 371 (c)(1),
(2) Date: Dec. 23, 2014

(87) PCT Pub. No.: WO2014/009820
PCT Pub. Date: Jan. 16, 2014

(65) Prior Publication Data
US 2015/0150299 A1    Jun. 4, 2015

(30) Foreign Application Priority Data

Jul. 9, 2012   (IT) .............................. PN2012A0041

(51) Int. Cl.
*A23N 15/02*    (2006.01)
*A23N 15/04*    (2006.01)
(Continued)

(52) U.S. Cl.
CPC ........... *A23N 15/02* (2013.01); *A23N 2015/006* (2013.01)

(58) Field of Classification Search
CPC ....... A23N 15/00; A23N 15/02; A23N 15/04; A23N 15/12; A23N 15/003; Y10T 83/2081; Y10T 83/8755; Y10T 83/8805
USPC ............. 99/638, 537, 642, 643, 646 R, 637; 460/125; 83/568
See application file for complete search history.

(56) References Cited

U.S. PATENT DOCUMENTS 2,825,375 A    3/1958    Gotelli et al.
3,065,777 A    11/1962   Allen et al.
(Continued)

*Primary Examiner* — Árpád Fábián-Kovács
(74) *Attorney, Agent, or Firm* — Birch, Stewart, Kolasch & Birch, LLP

(57) ABSTRACT

Apparatus for the separation of agricultural or vegetable product, with a fixed structure having two parallel horizontal side members, a plurality of cutting modules equipped with a common rotating shaft having a plurality of rotating blades in fixed position along its length, the shafts being parallel to each other and mounted above conveying elements suitable to carry the products placed thereon toward the rotating blades, a plurality of positioning ramps mounted in a position corresponding to a respective rotating blade and having a shape elongated in the direction of movement of the conveying elements and almost flattened and oriented vertically, the elongate upper edge of which is oriented downward toward the conveying elements with an inclination such that the height of the edges increases in the feeding direction of the conveying elements, so that the clusters of products placed on the conveying elements are carried toward the ramps. The respective upper edge determines the point of intersection of the respective blade with the stems of each cluster carried under the blade, so that the conveying elements include a table formed by a plurality of parallel grooves substantially orthogonal to the rotating shafts and reciprocally separated by respective raised portions. The table moves in a direction parallel to the grooves; and the ramps are arranged in positions corresponding to the respective grooves. The projection of each of the ramps with respect to one of the groove is aligned with the same groove.

9 Claims, 15 Drawing Sheets

(51) Int. Cl.
 *A47J 21/00* (2006.01)
 *A23N 15/00* (2006.01)

(56) References Cited

U.S. PATENT DOCUMENTS

| | | | |
|---|---|---|---|
| 3,115,169 A | 12/1963 | Rodriguez et al. | |
| 3,115,170 A * | 12/1963 | Rodriguez | A23N 15/02 460/125 |
| 3,797,503 A * | 3/1974 | Dentant | A23N 15/12 460/125 |
| 4,420,118 A * | 12/1983 | Gehlen | A23N 15/003 198/624 |
| 4,784,057 A * | 11/1988 | Mietzel | A23N 15/12 460/125 |
| 5,050,492 A | 9/1991 | Wotton et al. | |
| 7,033,631 B1 | 4/2006 | Opedal | |
| 7,487,719 B2 * | 2/2009 | Fernandez | A23N 15/00 426/478 |
| 8,757,054 B2 * | 6/2014 | Benedetti | A23N 15/02 99/637 |
| 2010/0029351 A1 * | 2/2010 | Benedetti | B65G 51/01 460/125 |

* cited by examiner

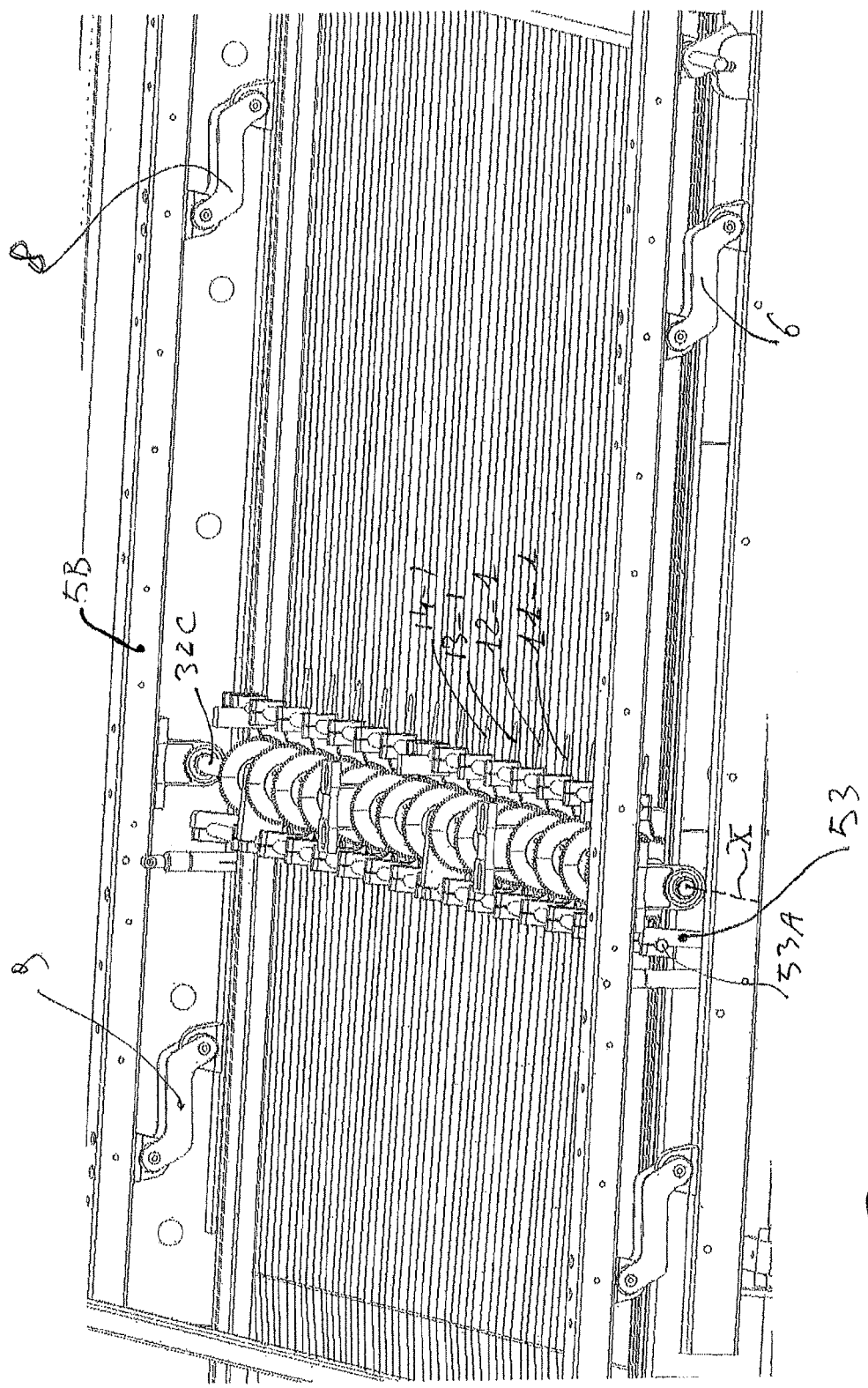

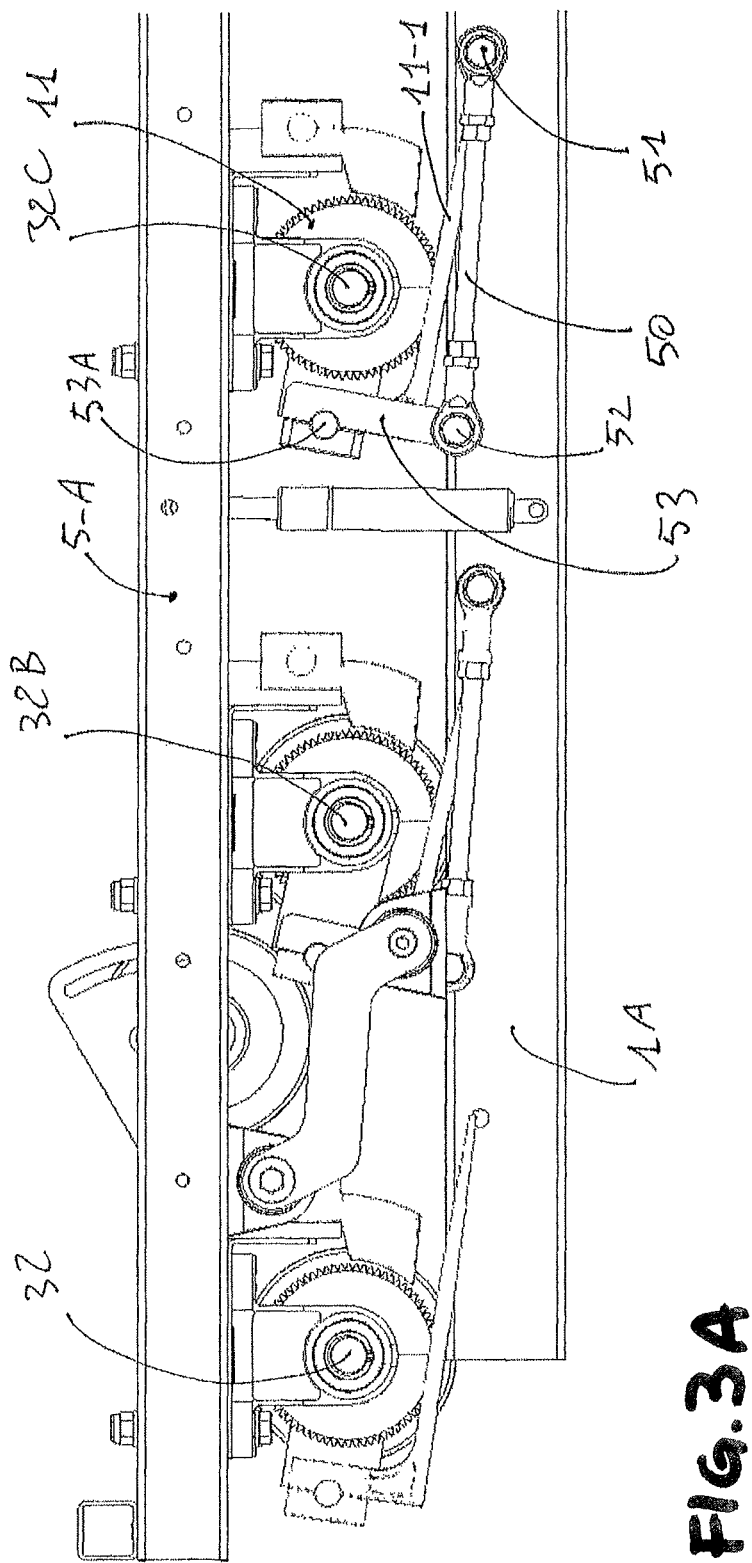

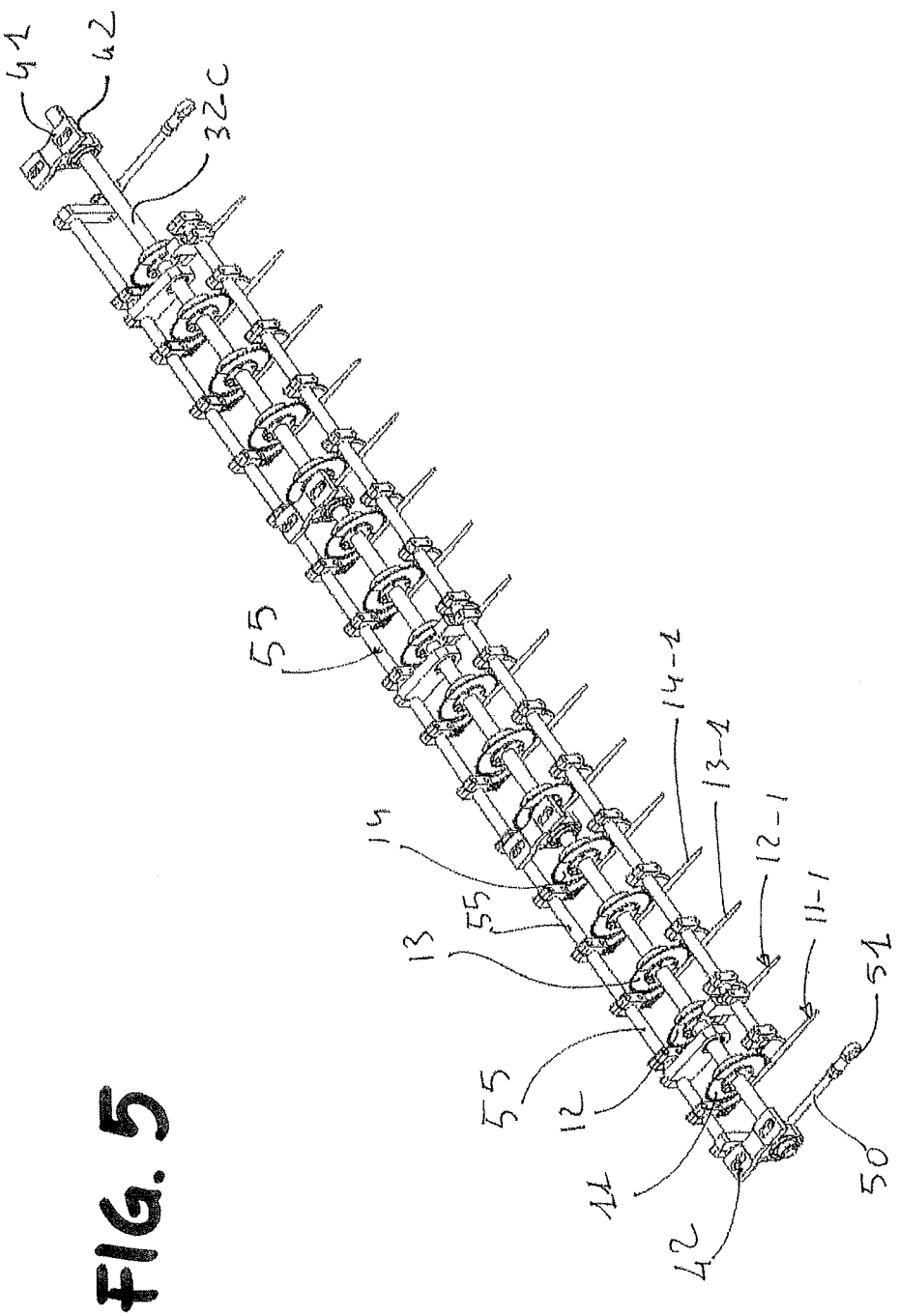

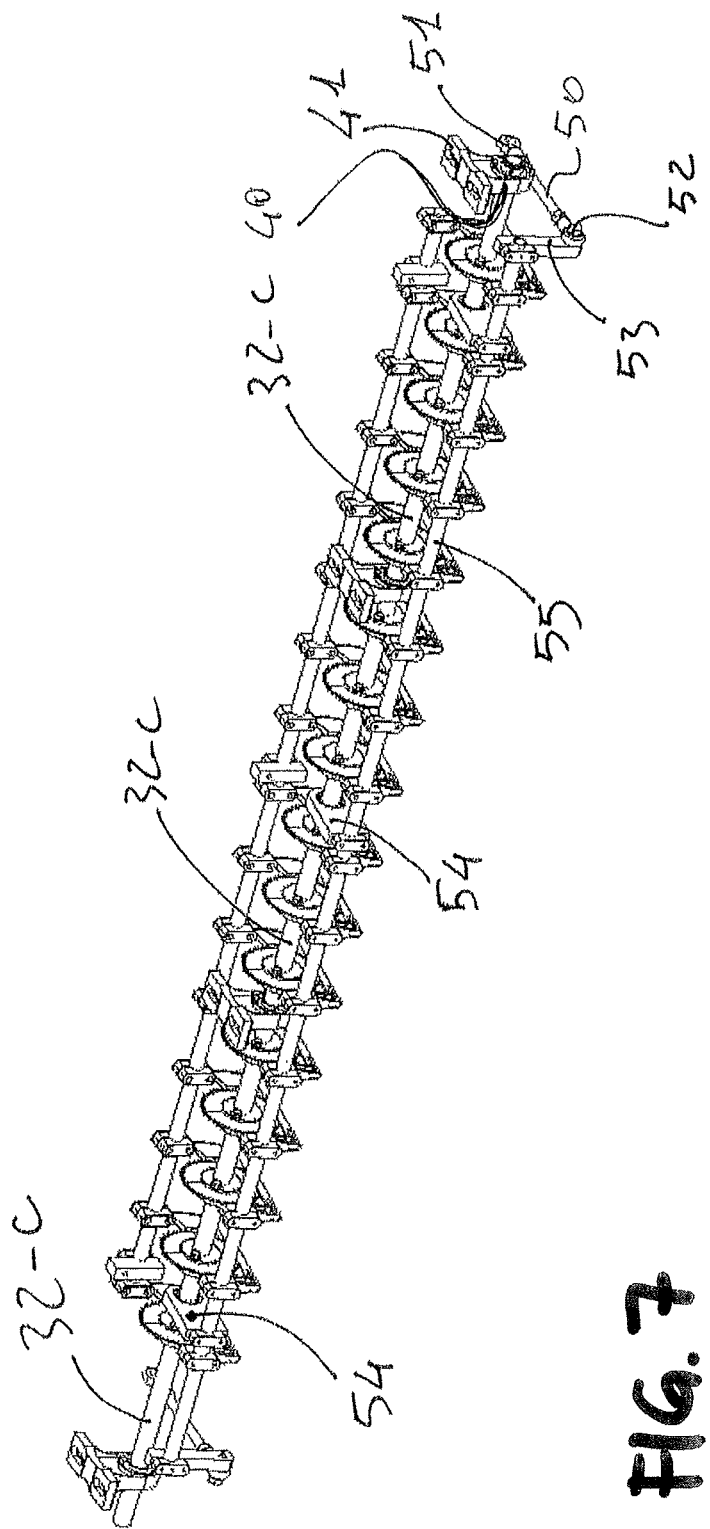

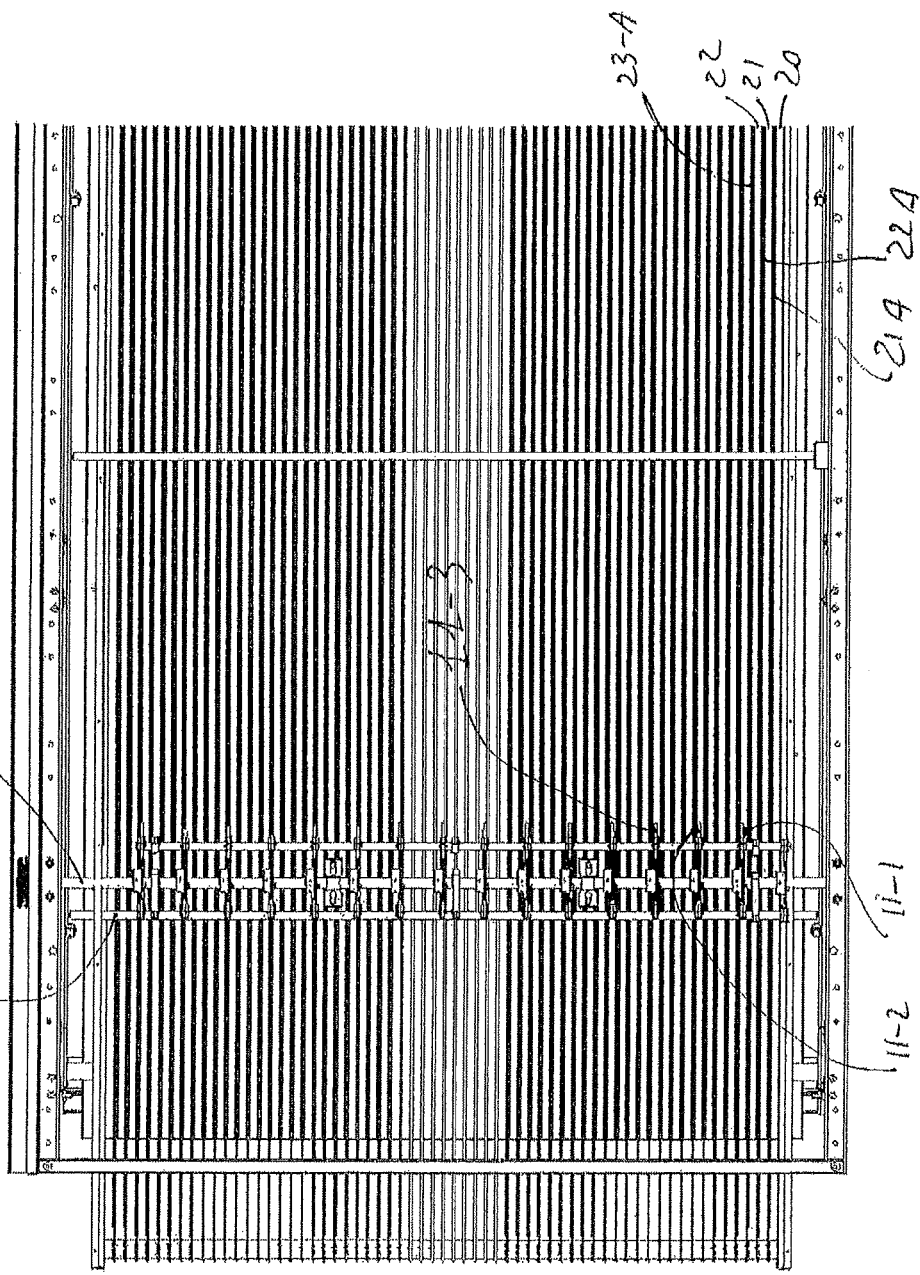

APPARATUS FOR SEPARATING AGRICULTURAL PRODUCTS

BACKGROUND OF THE INVENTION

The present invention refers to an improved apparatus for the separation of agricultural or vegetable products that are joined to each other through relative connecting appendages, such as petioles, stems, stalks, etc., as for example cherries, small clusters of cherry tomatoes, etc., that have been previously picked and that normally arrive joined in small bunches or that are still connected to each other through the relative stems, in particular in the case of cherries.

It is well known that such vegetable products are cultivated on an industrial scale to be marketed through the networks of the large-scale retail trade. In order to be prepared for such use, the products must normally go through suitable treatment and processes, such as washing, separation from each other when they occur in bunches, clusters, etc., weighing, sizing, sorting on the basis of predefined characteristics such as colour, degree of ripeness, etc.

In general, these sorting operations are widely known and easily carried out without particular problems when the vegetable products reach the sorting systems and are loaded on it piece by piece, as is the case with apples, pears, melons, etc. On the other hand, if these products are still bunched together, one of the first operations to be carried out on them is naturally to separate them.

Thus, when it is necessary to process agricultural products that are intrinsically joined in bunches or clusters, such as for example cherries, green beans, etc., it is evident that to singularize the produce (it is assumed that this term is well known to a reader who is an expert in the field), it is essential to eliminate any vegetable elements, such as stems, stalks, and petioles that originally keep the vegetable products bunched together.

For this purpose, there are various widely known processes and systems used to separate the groups of products into single products, that is, separated from each other.

Hereafter will be considered those systems that are used to separate the clusters exclusively by cutting the stems, stalks, etc., with rotating blades.

Later in the present description, specific reference will be made to cherries, but it is implicit that what is illustrated applies without any reserve or limitation to any other type of product having similar characteristics of occurring in bunches, clusters, etc.

Various known documents and patents illustrate different processes and elements suitable to performs the operation of cutting the stems, such as for example:

U.S. Pat. No. 5,050,492; U.S. Pat. No. 3,115,169; FR 2 672 776; ES 2241 465; FR 2 892 053.

The majority of such patents perform the cut by carrying the clusters to be processed/cut by moving belts, on which the clusters are often piled up in disorderly heaps.

The solution with moving belts, although simple to apply, does not however ensure that the cutting of the stems will be carried out in a regular manner, and particularly at a point removed from the knot joining the stems; this also occurs if the stems in the clusters are overlapped on the belts, due to the fact of being loaded on the belts in a haphazard and unguided manner.

This causes a serious problem in the field: in fact, it is widely observed that, in order to ensure a more pleasing and attractive presentation for the average consumer, it is essential that the stems of such products, for example cherries, be cut at a point nearest to the point or node connecting the stems, so as to avoid the very undesirable effect that some stems are too short, while other stems remain needlessly connected through a V-shaped connecting point.

Practically, this happens if the transportation and cutting elements neglect the essential fact that the length of the stems can vary, even considerably, from one lot of product to another.

Moreover, the use of the same system, be it of belt type or flat conveyor type, to carry clusters of different characteristics to the cutting area, almost always generates the problem described above.

U.S. Pat. No. 7,033,631 B1 discloses an apparatus suitable to carry the clusters to be separated to a cutting area having a plurality of rotating blades, where the individual clusters are sent on a plurality of upward sloping ramps of triangular cross section, so that the clusters overlap each other in a suitable manner in which the part of the stem that arrives at the point of intersection with the blade is naturally the closest part to the point that joins the stems.

Moreover, the height of the ramps can be adjusted to suit the average length of the stems of the lot of product to be separated.

However, this solution presents some serious drawbacks; in fact the movement of the clusters toward the rotating blades is obtained by a continuous shaking on the inclined support plane on which the clusters to be cut are placed, and this shaking is harmful for the products, especially in the case of delicate produce, due to their rubbing against the plane itself.

The continuous shaking of the inclined support plane also requires a suitable mechanism with a motor to which are connected cam elements, and, as is well known, the production of an alternative movement of a rigid structure with respect to another rigid structure entails a greater complexity of construction of all the drive and control devices.

Finally, as can be appreciated from FIG. 9 of the above-mentioned U.S. Pat. No. 7,033,631 B1 patent, the inclination of the ramp 46 is substantially constant, apart from the end section 48, which has an inclination slightly different from the inclination of the initial section; and these inclinations of the ramp 46 are invariable, that is, they cannot be modified to suit the length of the stem; this causes an inefficient adjustment of the cutting operation because, as is shown in FIG. 9, with short stems the cherries can reach a position on the ramp 46 such as to become detached from the vibrating plane 38, and thus their movement toward the rotating blades will obviously be hindered, or even prevented.

It would therefore be desirable, and is the main objective of the present invention, to realize a type of automatic system for cutting the stems of the clusters of vegetable products that makes it possible to cut the stems in the area of the point of connection, without encountering the problems described above.

This objective is achieved through an apparatus built and operating in accordance with the accompanying claims.

BRIEF DESCRIPTION OF DRAWINGS

Characteristics and advantages of the invention will be evident from the following description, given by way of example and without limitations, with reference to the enclosed drawings, wherein:

FIGS. 2, 3 and 4 illustrate respective schematic and enlarged views, similar to FIG. 1, of respective operating arrangements of an individual cutting module of an apparatus according to the invention;

FIGS. 2A, 3A and 4A illustrate respective views in lateral plane projection of a portion of an apparatus according to the invention, corresponding respectively to the arrangements of FIGS. 2, 3 and 4;

FIG. 5 illustrates a simplified perspective view from above of a portion of the apparatus shown in FIG. 1, seen from a point ahead of the axis of rotation of the rotating blades;

FIG. 7 illustrates a view of the portion of FIG. 5, seen in a diagonal perspective from above but from a viewpoint behind the axis of rotation of the rotating blades;

FIG. 8 illustrates a plane view from above of the portion of the apparatus of FIGS. 5-7A;

DETAILED DESCRIPTION OF THE INVENTION

With reference to the figures, an apparatus for cutting the stems of clusters of vegetable products, in particular cherries, comprises in general:

a support structure with a frame with two parallel horizontal side members 1A, 1B defining between them a substantially flat surface "S", typically rectangular; surface "S" is a purely geometrical definition, and does not identify any material elements, as will become clear in the description;

a plurality of cutting modules 2A, 2B, 2C, 2D, 2E, . . . , that are substantially identical to each other and each provided with a common rotating shaft 32A, 32B, 32C, 32D, 32E, . . . ; the rotating shafts being parallel to each other and arranged above surface "S", and therefore are in succession, so as to be able to intercept practically all of the clusters of products carried by the underlying table.

Figure 2:
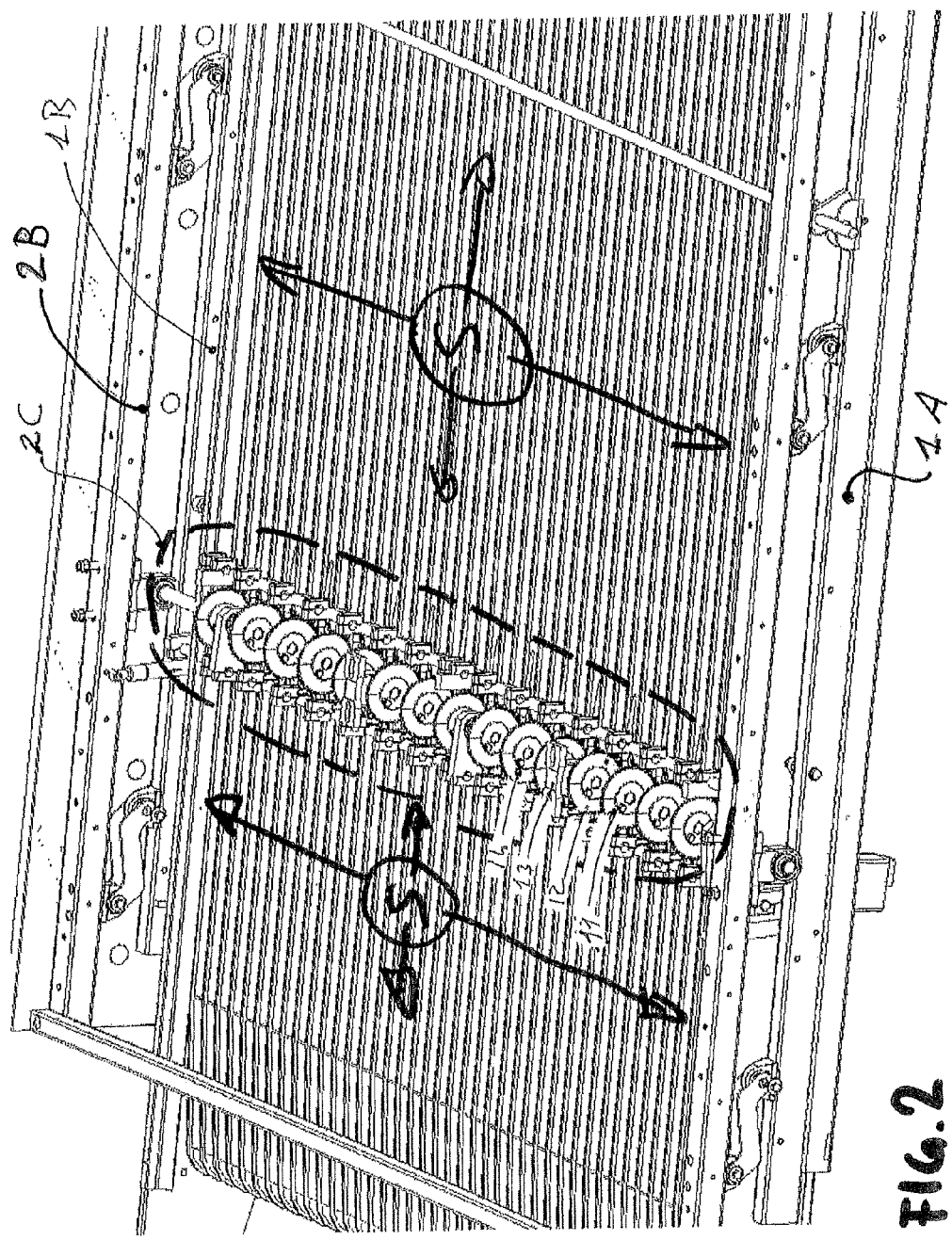

The cutting modules are identical and therefore, for the sake of simplicity, only one of them will be described hereafter, for example module 2C (see FIG. 2), it being understood that the relative explanation extends to all the other modules.

In general, the description and the claims will refer sometime to a single element, and sometime to a number of similar elements; since the cutting modules are substantially similar, and since each cutting module includes a plurality of rotating blades and relative associated elements, in particular the relative ramps and the elements suitable to modify their position, that are similar or identical, it remains likewise understood that the reference to a single one of such modules, or to a single one of the elements or blades extends successively and obviously to all the other modules and other elements or blades, as is shown clearly in the enclosed figures.

The rotating shafts are arranged above the conveying elements that cover surface "S", which conveying elements are suitable to carry the produce placed on them toward the rotating blades.

The module 2C is equipped with:

a plurality of rotating blades 11, 12, 13, 14, . . . , arranged in fixed positions along its length;

a plurality of positioning ramps 11-1, 12-1, 13-1, 14-1, in which each of the ramps is arranged in a position corresponding to a respective rotating blade;

the ramps having an elongate shape in the direction of movement of the conveying elements and noticeably flattened and oriented vertically;

the respective upper edge of which is oriented downward toward the conveying elements, with an inclination such that the height of the edges increases in the direction of the respective blade, arranged above the conveying elements;

so that the clusters of produce placed on the conveying elements are carried toward the ramps whose upper edge set at an acute angle, respectively 11-2, 12-2, 13-2, . . . (FIG. 10), determines the point of intersection of the stems of each cluster that is intercepted by the relative blade.

To be precise, each ramp is aligned with the respective blade, and is arranged in its lower area; in order to allow the ramp to carry the clusters of produce toward the respective blade, the ramp is provided in its upper part with a respective recess 11-3, 12-3, 13-3, 14-3 of a size suitable to accommodate the relative blade 11, 12, 13. 14, . . . . In this manner, the clusters of vegetable products are carried toward the ramps, each of which intercepts a single cluster at a time and lifts the relative stem, which straddles the ramp, and thus, continuing on its movement, is intercepted by the relative blade and cut at the corresponding point on the respective edge.

Figure 9:
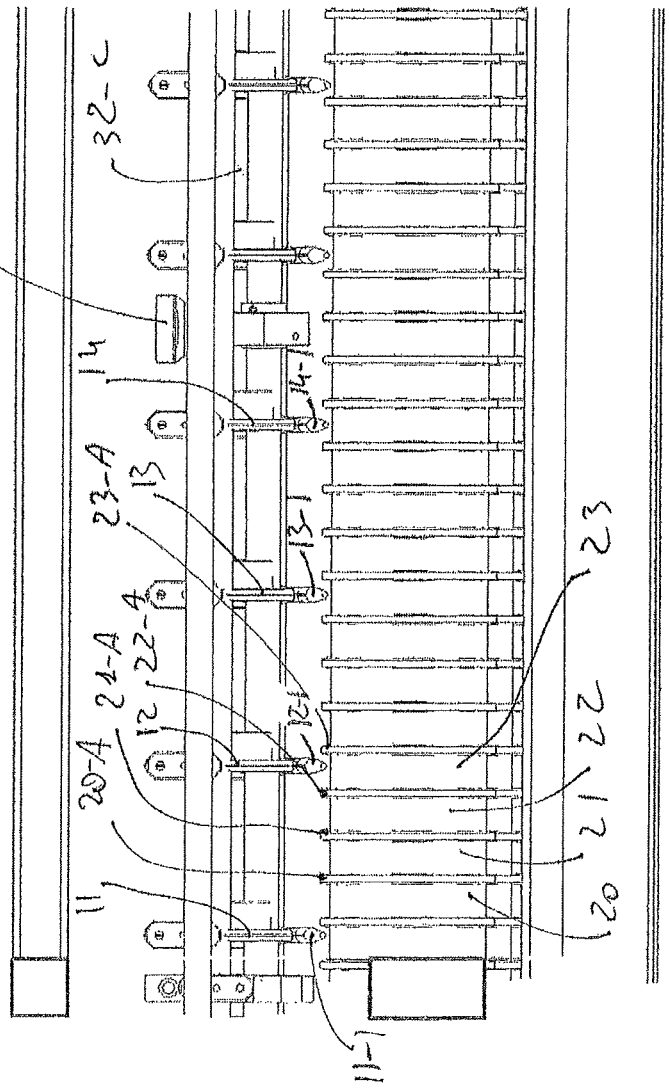
FIG. 9 illustrates a front plane view of the apparatus of FIGS. 5-7A.

Also, as essential element for the functioning of the invention, the transportation and movement of the conveying elements is attained as follows:

With reference to FIG. 9, the conveying elements include a table formed by a plurality of parallel grooves 20, 21, 22, 23, 24, 25, . . . arranged horizontally and substantially orthogonal to the rotating shafts.

The grooves are reciprocally separated by respective raised portions 20-A, 21-A, 22-A, . . . ; the set of grooves and relative raised portions is typically formed by a continually moving conveying belt.

This moves in a direction parallel to the grooves 20, 21, 22, 23, 24, 25 and relative raised portions, and thus moves orthogonally to the rotating shafts.

Figure 10:
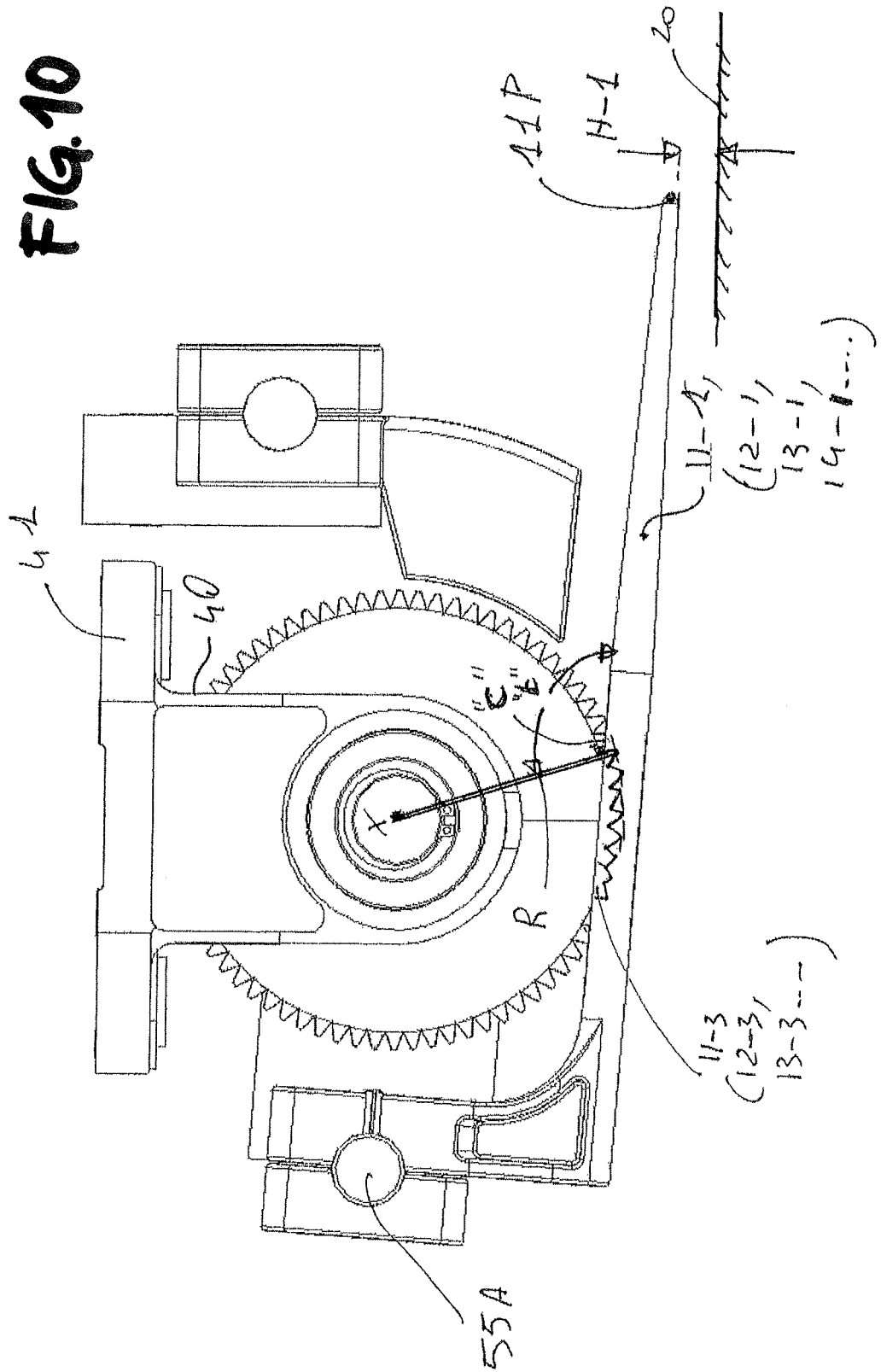
FIG. 10 illustrates an aligned lateral plane view of a detail of the apparatus of the above FIGS. 5-7A.

In addition, each ramp is superimposed on a respective groove and is inclined and aligned with respect to the latter, so that the projection of each of the ramps with respect to the relative groove is aligned with the same groove; in particular, the position of the tip 11-P, 12-P, 13-P, 14-P, . . . (see FIG. 2) of the ramps is set at an optimal height H1 from the top surface of the respective groove, as shown in FIG. 10.

Since, in fact, most of the vegetable products, in particular cherries, that are joined in one cluster, come to be inside the same groove, it is evident that the operation of cutting the stems is more effective and productive if the cutting blades, and therefore the relative ramps, are centred and aligned within respective ones of the grooves.

In fact, the task of performing the cutting of substantially all the stems relies on the fact of having not only one cutting module, but a plurality of cutting modules 2A, 2B, 2C arranged in succession, one downstream of the next, with respect to the direction of movement of the table formed by the grooves alternated with respective raised portions.

The operation of the apparatus described here is as follows: the various clusters are set down and distributed with known elements and configurations on the table formed by the various grooves 20, 21, 22, 23, 24, 25, . . . and the relative raised portions 20-A, 20-B, 20-C, 20-D, . . . .

With the movement of the conveyor toward the ramps and rotating blades, the products reach the position of the ramps, and due to the dragging movement to which the stems are subjected they are intercepted by respective ramps and are thus naturally captured and lifted, by effect of the dragging movement, up to where they reach the relative rotating blade, which cuts them exactly at the upper edge of the relative ramp.

Thus is achieved a first objective of the invention, which consists of carrying the various clusters to the cutting station without subjecting them to vibrations, shaking, etc., which would naturally damage them.

However, as already mentioned, the situation described above yields optimum results only if the distance of the upper edge of the ramp from the bottom of the adjacent groove is substantially similar to the height of the stem or, more precisely, to a length of the stem such that, considering also the size of the fruit, the knot of the stem positions itself exactly, or almost exactly, at the height of the upper edge of the ramp.

In fact, if this condition does not occur, and if for example the stem is longer, it may happen that the ramp could fail to catch and lift the knot, because the knot positions itself naturally on the ramp itself; in this situation, the blade reaches the stem, and then cuts it in a position far from the knot, which would be decidedly unhelpful and undesirable.

Another serious shortcoming found in similar machines already present and operating on the market, consists of the fact that, although they are built with a plurality of cutting modules, each of which is fairly similar in principle to the cutting modules 2A, 2B, 2C, 2D, 2E, . . . of the present invention, these machines require however that, when it is necessary to modify the height or the inclination of the ramps, it is also necessary to operate:

not only one by one the mechanisms/devices that regulate the height of each of the cutting modules, that is, the height of the respective rotation shaft on the table, but also to adjust the devices that modify the inclination of the ramps relative to each rotating shaft of the respective cutting module.

This operation, although straightforward and easy, is still extremely time-consuming from the productive point of view, as it requires interrupting the processing of the products and intervening manually and sequentially on each cutting module.

From the economical point of view, this situation is unacceptable both because it forces a machine shut-down that can sum up to a few hours, which is intolerable when it is necessary to process fresh, delicate and prized produce in very short times, and because of the burden of the maintenance and operating times that must be expended to adjust, one by one, the position of the individual cutting modules.

To overcome these serious disadvantages, the improvements hereunder teach the implementation of such elements as make it possible to adjust as desired the height of the ramp over the underlying table (grooves and raised portions), and at the same time to also adjust the height of the relative rotating shaft, so that the relationship between the shaft, and therefore the relative rotating blades, and the relative ramps, is substantially constant or almost so, with such a procedure and elements as make it possible to adjust the height of all the cutting modules automatically and all at the same time, in a single operation, so that all the cutting modules are adjusted to a new operating condition.

It is clearly evident that such elements and the relative operating procedure allows a dramatic reduction of the times that were previously required to adjust the machine; this is so evident that it will not be specified further.

Figure 1:
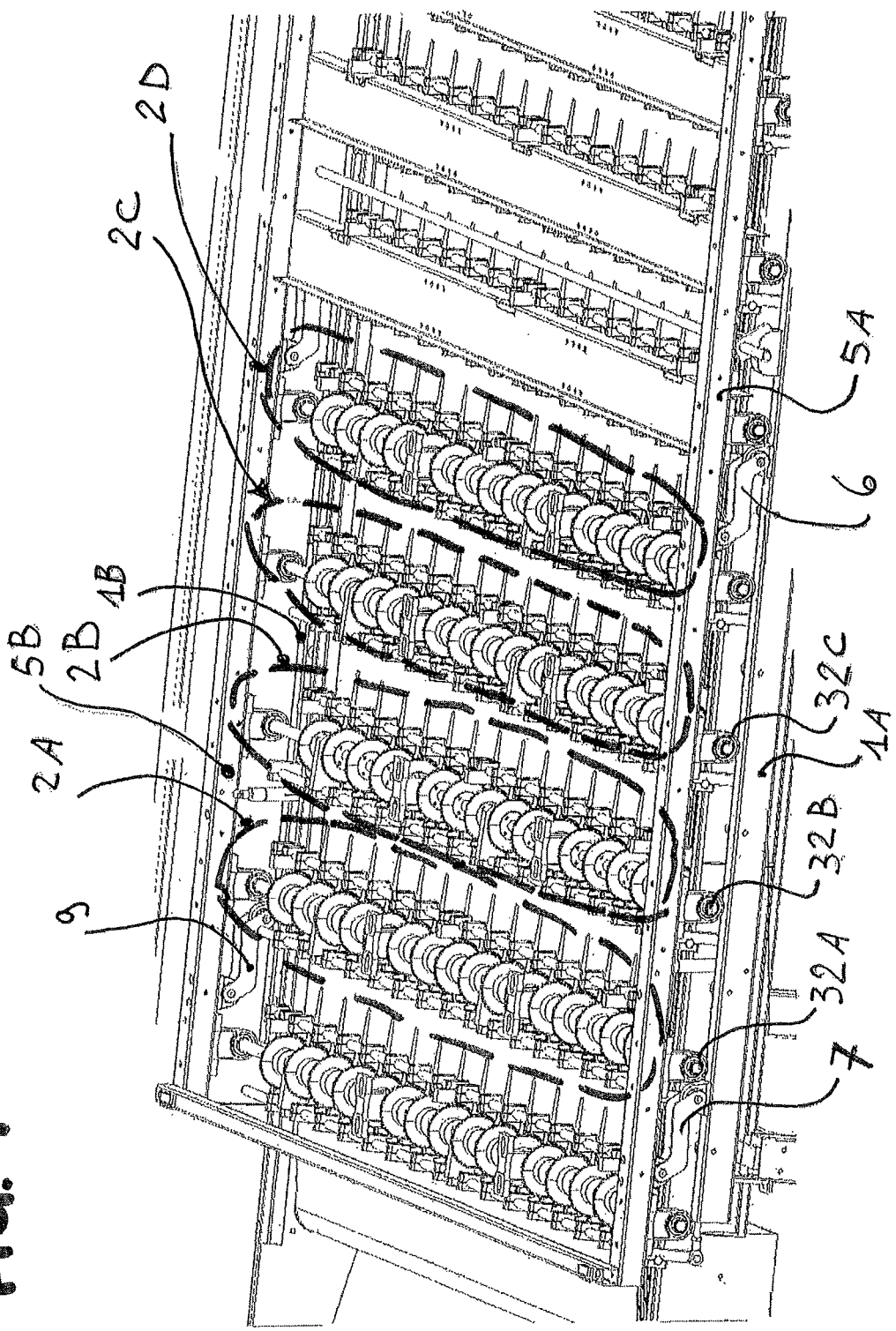
FIG. 1 illustrates an external perspective view from a diagonal position of an apparatus according to the invention.

For the purpose hereof, and referring to the figures, a mobile structure is provided:

formed substantially with a geometry similar to the geometry of the support structure 1A, 1B, and comprising two parallel horizontal side members 5-A, 5-B (see FIGS. 1, 2 and 3), overlying the support structure;

the mobile structure being connected to the fixed structure through a plurality of movable arms, ideally only four arms 6, 7, 8, 9 (FIG. 1);

each of which is connected (FIG. 2A) with one of its ends 6A to a position in the side member 1A, and with the respective other end 6B to a respective position of the side member 5-A belonging to the mobile structure, wherein the ends 6A, 6B relative to a specific arm 6 are arranged on different vertical straight lines r, t.

Thus, if such configuration is replicated, with identical measurements, for both side members of both the mobile structure and the fixed structure, the configuration illustrated in FIG. 1 is obtained.

In practice, each lower side member of the fixed structure is connected to the overlying side member of the mobile structure through two similar pairs of separate arms 6, 7 and 8, 9.

Thus a construction of a "parallelogram" type is provided, so that the mobile structure becomes suitable to move with respect to the fixed structure by use of a movement that will be defined hereunder as "translational motion following a rotating path".

Figure 11:
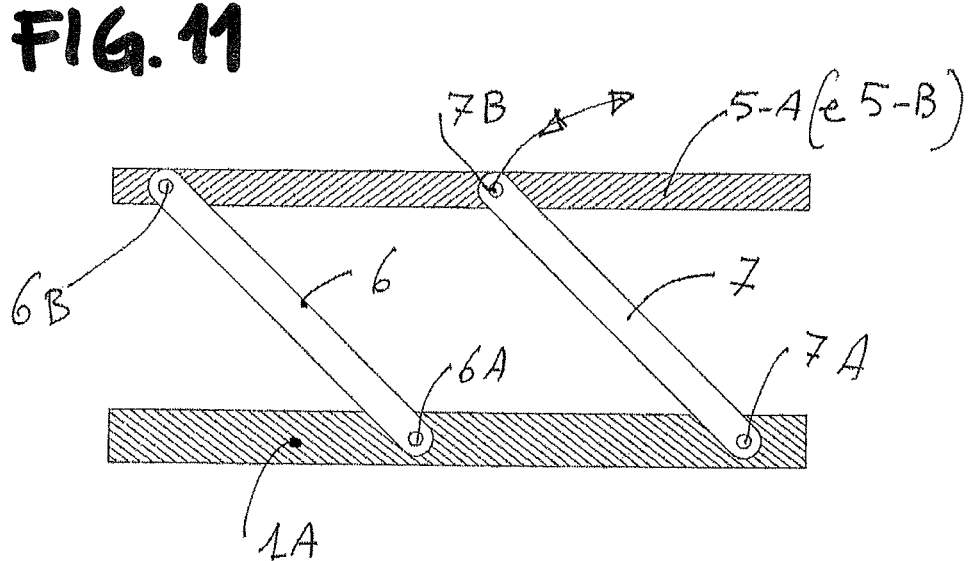
FIG. 11 illustrates a basic schematic diagram of a manner of operation of the invention.

In fact, the mobile structure rotates effectively around predefined points of the fixed structure, due to its being pivoted on arms 6, 7, 8 and 9, but also due to the "rhombus" shaped structure that is formed:

by to two arms 6, 7 placed substantially on the same vertical plane between a pair of fixed and mobile side members 1A and 5-A;

and by to the portions of the same side members included:

between the pivot points 6A, 7A located on the side member 1A, and similarly between the pivot points 6B, 7B (these are shown in FIG. 11) relative to the side member 5-A.

However, FIG. 11 clearly illustrates the geometrical situation described above, referred to only the side members 1A and 5-A.

If the upper structure comprising the side members 5-A and 5-B is lifted (through known elements that are not included in the invention), then, as shown schematically in FIG. 11, the same upper side members 5A and 5B are displaced with a translational motion, because they are always parallel to each other, but also with a rotatory motion, because the mobile arms remain hinged on the respective pivot points on the fixed lower structure.

We have thus explained the meaning of the "translational motion following a rotatory path" defined above.

Besides, this is the typical movement of any structure in the shape of a parallelogram.

In short, given the configuration illustrated herein, it becomes possible to lift the mobile structure, with respect to the fixed structure, and in particular the side members 5-A, 5-B with a translational motion following a rotatory path.

Moreover, the ramps are connected to the two upper side members 5-A and 5-B of the upper mobile structure, so that its lifting also automatically generates the partial lifting of the relative ramps, however without having the position of the respective points increasing or decreasing its vertical distance from the underlying groove, although it may happen that the horizontal position of the same points is modified.

The manner of this connection is explained below.

Naturally, it becomes necessary that the lifting or lowering of the ramps does not cause any problem with the respective blades, which must not be brought to interfere with the ramps themselves, and in any case the reciprocal distance and geometry of the ramp and the respective blade must be respected.

As a result, the axes "X" of the rotating shafts must also be made integral, in the same sense just explained, with the side members.

Figure 2A:
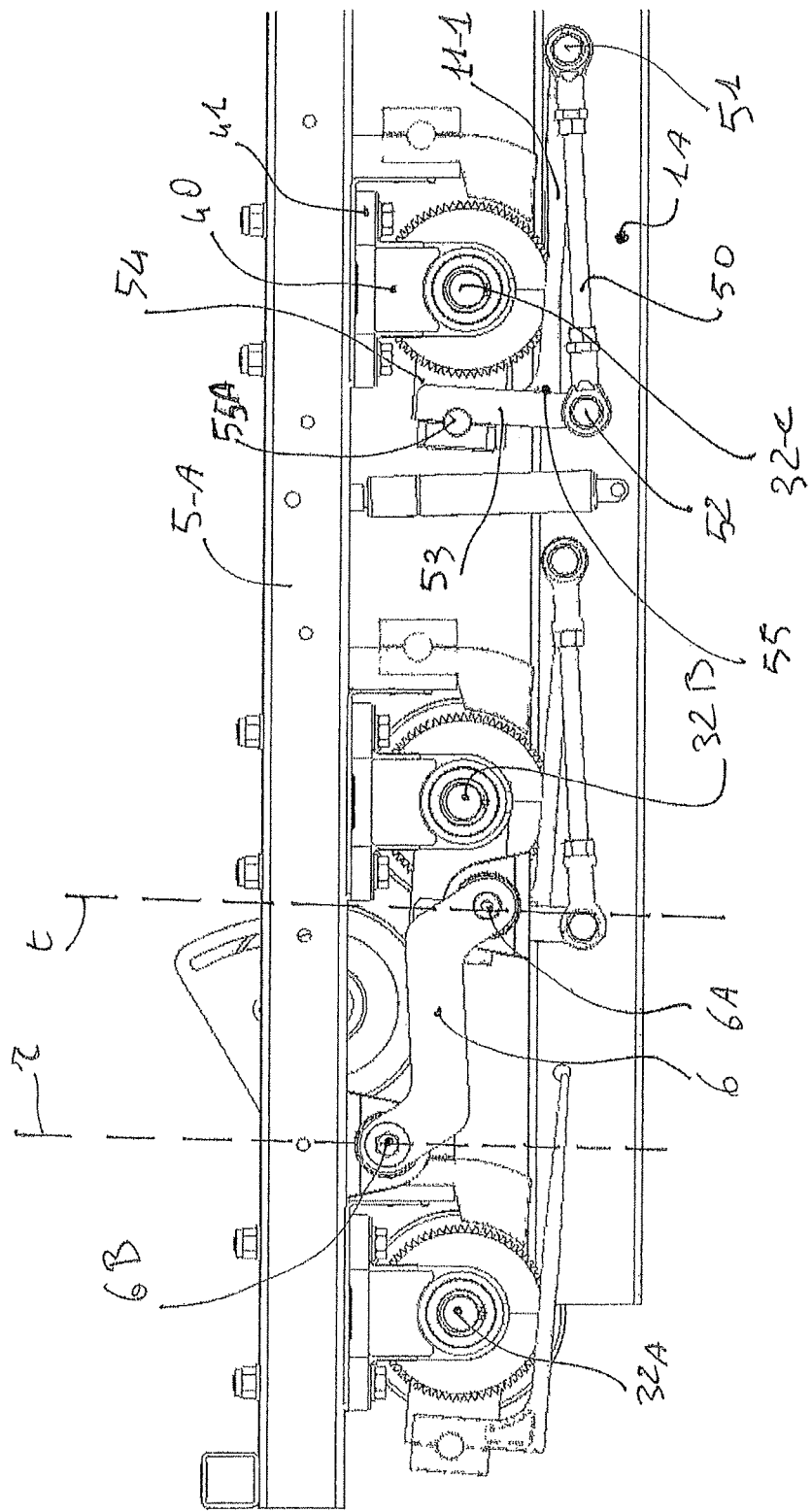
Figure 4:
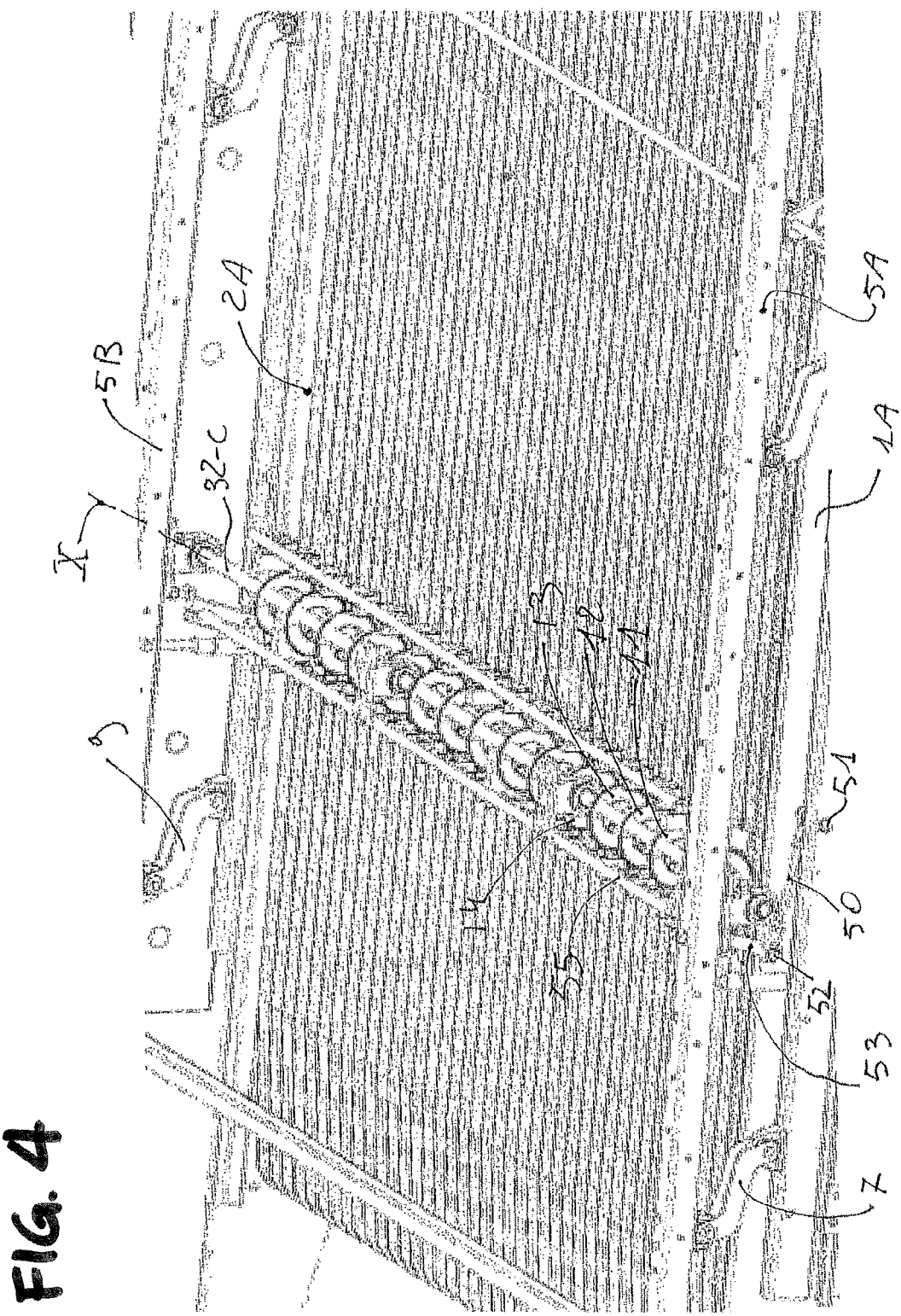
Figure 4A:
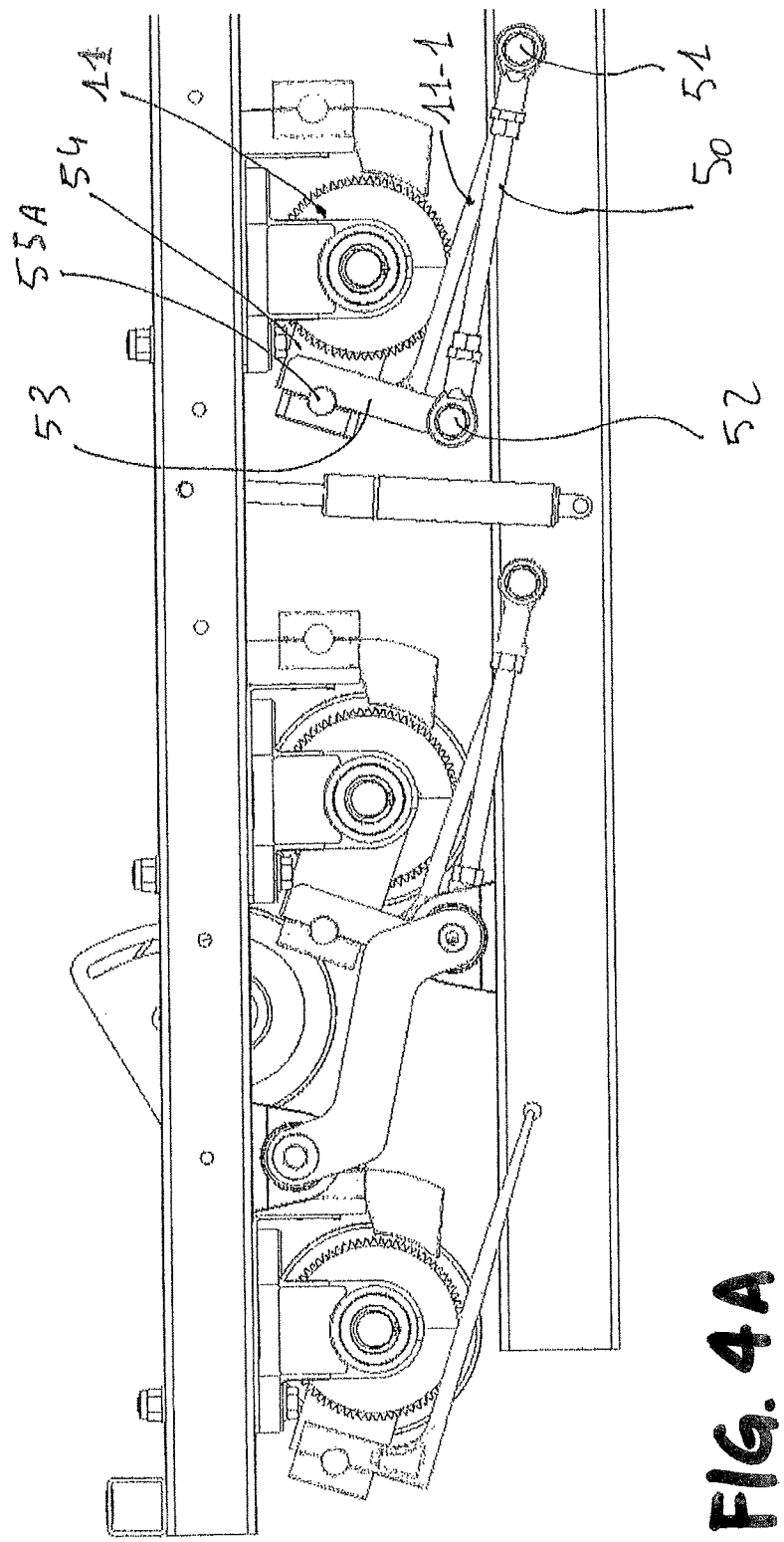
Figure 6:
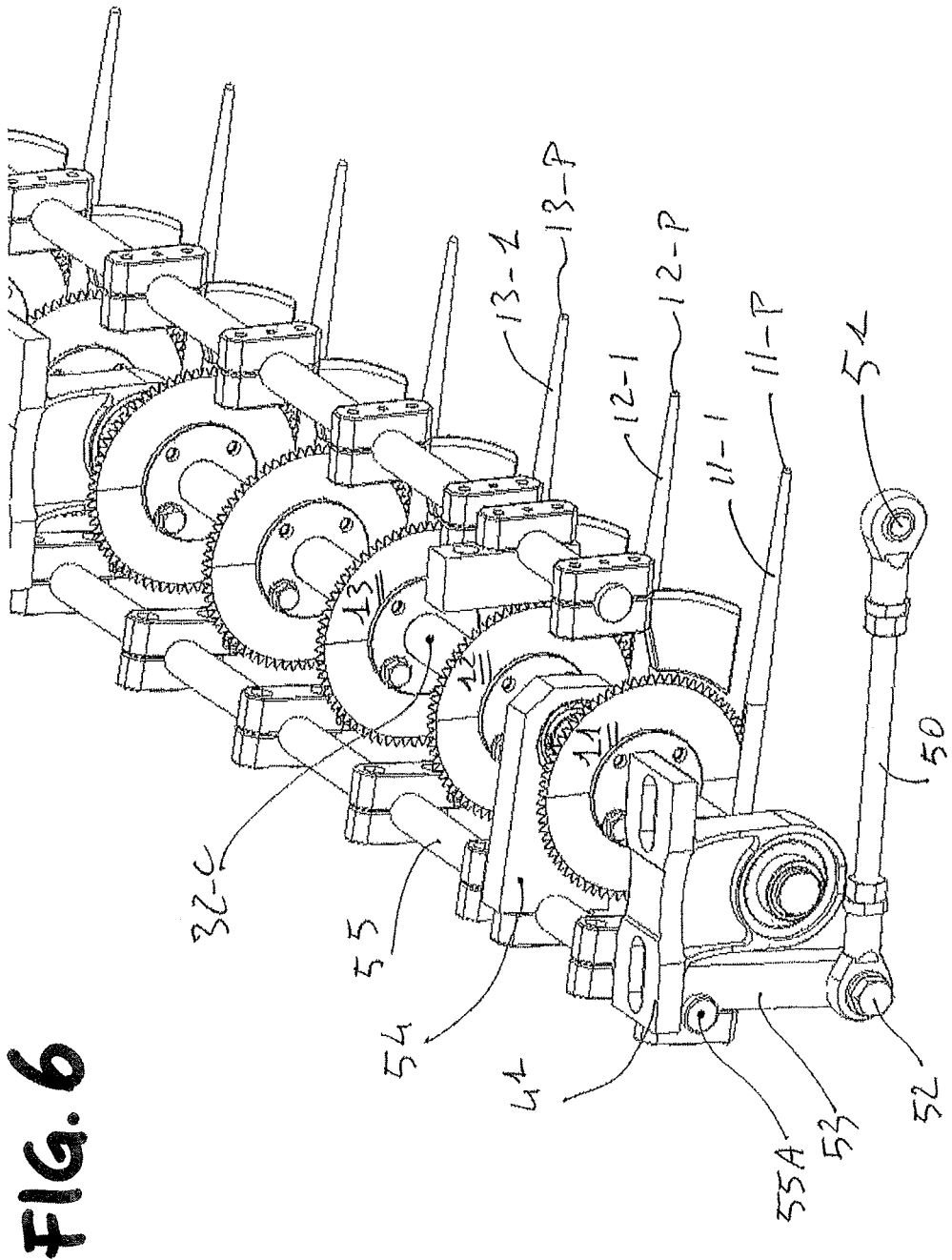
FIG. 6 illustrates a view similar to FIG. 5, but with a single enlarged portion and from a viewpoint nearer to the axis of rotation of the rotating blades.

For this purpose, and with reference to FIGS. 2A, 3A and 4A, the shafts 32A, 32B, 32C, 32D, 32E, . . . are mounted on the two upper side members 5-A and 5-B through normal connecting devices, here represented (FIGS. 6, 7, 7A) by two brackets 40, 41 for the shaft 32C.

For what concerns the ramps relative to this cutting module and to the shaft 32C, mechanical connecting elements are arranged which comprise, for each cutting module, a connecting pole 50 pivoted, at one end 51, on a fixed position of the support structure, and in effect to the lower side member 1A, and with the other end 52 on a first mechanical linking element 53 secured to an auxiliary shaft 55, which is in turn secured to one or more second mechanical linking elements 54 (see in particular FIGS. 7 an 7A) connected to the respective rotating shaft 32-C in a manner that will be explained hereunder.

Figure 7A:
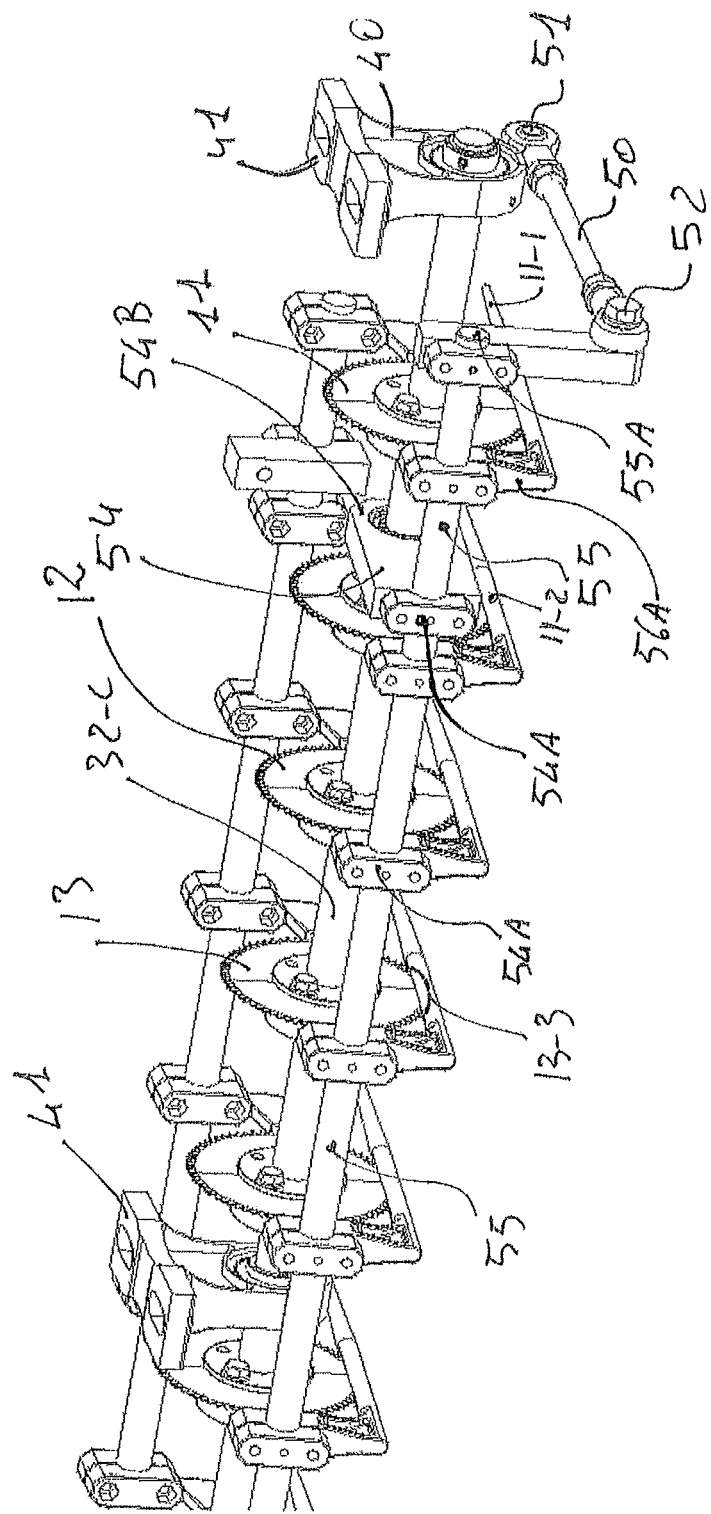
FIG. 7A shows an enlargement of a lateral part of the portion of the apparatus of FIG. 7.

With particular reference to FIGS. 2A, 4A and 7A, said auxiliary shaft 55 is a non-rotating shaft, arranged parallel to the respective rotating shaft 32C, and engaged at one end 55A with the first mechanical connection 53.

The second mechanical linking element 54 is engaged, at one of its ends 54A, with the shaft 55, and at the other end 54B, with the rotating shaft 32C, in a manner that will be described hereunder.

In addition, on the same auxiliary shaft 55 are fastened integral thereto a plurality of arms 56A, 56B, 56C, 56D, . . . , all of which support respective ramps 11-1, 12-1, 13-1, 14-1, . . . at one of their respective lower ends.

It should be immediately made clear that the devices connecting the auxiliary shaft 55 to the mechanical linking elements 53 and 54 and to the arms 56A, 56B, 56C, 56D, . . . are such that the shaft 55 is non capable of rotating, about its own axis, with respect to the linking elements and ramps, so that ultimately the types of connecting devices translate into through holes arranged on the linking elements 53 and 54 and arms 56A, 56B, 56C, 56D, . . . which through holes are traversed by the same auxiliary shaft 55, which however is not capable of rotating with respect to them.

Finally, the type of connection of the second linking element 54 with the end 54B on the rotating shaft 32C is a rotating connection, naturally in the sense that the shaft 32C traverses in a suitable through hole the end 54B of the second linking element 54, but it can rotate about its own axis, and thus the through hole in the end 54B maintains only a definite geometrical position between the linking element 54 itself and the axis of rotation of the shaft 32C, but evidently not between the same linking element 54 and the shaft 32C.

And thus the second linking element 54 is suitable to rotate—only marginally however, as will be explained later—about its respective shaft 32C.

Given the configuration of the elements and devices involved, and comparing together the three FIGS. 2A, 3A and 4A, which show the upper side member 5-A in the two extreme positions of minimum distance and maximum distance, and in an intermediate position, it follows that if the upper side members 5-A and 5-B are lifted, the respective rotating shafts 32-A, 32-B, 32-C are also automatically lifted, and the latter also pull upward the second connecting element 54, which yanks up the respective auxiliary shaft 55, which in turn pulls upward the relative arms 56A, 56B, 56C, . . . , which finally also yanks up the relative ramps.

However, due to the fact that the shaft 55 is not free but is connected at its end 55A to the first linking element 53, which is connected to the connecting pole 50, which is in turn connected to the lower side member with the pivot point 51, it follows that the mechanical linking elements, and therefore the ramp, are not only lifted but also rotated.

Without entering into a rather complex and not essential geometrical discussion, it suffices to note that the ramps, the mechanical linking elements, the mobile arms, their points of application on the respective structures, the jointed arms must be dimensioned, positioned and joined to each other so that the lifting of the mobile structure, exemplified by the upper side members 5-A and 5-B—with respect to the fixed structure—causes the translational-rotatory motion which naturally entrains an equivalent movement in the axes of the respective rotating shafts, because the latter are connected to the upper mobile structure—which includes the side members 5-A and 5-B—by the brackets 40, 41.

The translational-rotatory motion of the rotating shafts 32-C causes the lifting of the respective second linking elements 54, which drag the auxiliary shaft 55 and also the arms 56-A, 56B, 56-C, . . . , so that the tips of the respective ramps—which are connected to the arms—maintain substantially the same height separation H1 on the respective groove, while instead the inclination of the ramps changes with the translational movement following a rotatory path (see FIG. 11).

Figure 12:
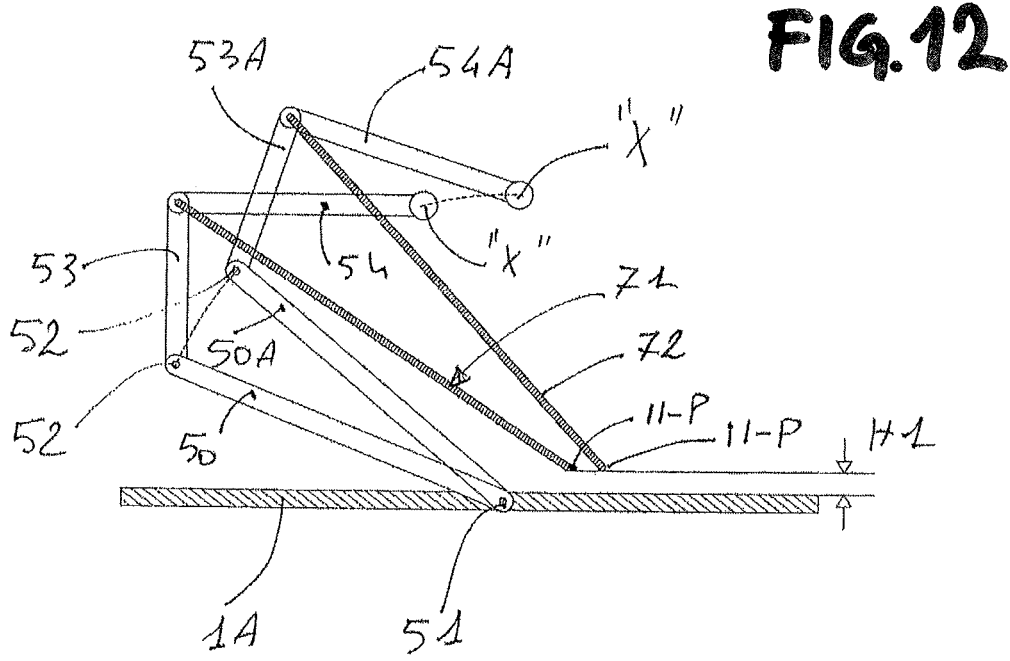
FIG. 12 illustrates a simplified geometrical schematic diagram of the basic manner of operation of the invention, as seen in a lateral flat projection.

A person skilled in the field is perfectly capable of imagining and defining the necessary dimensions; only for greater clarity, FIG. 12 gives an extremely simplified schematic view of the devices involved, that have been described in the two conditions of minimum and maximum distance between the side members of the two structures, the fixed one and the mobile one.

In the schematic are shown, in particular:
the upper side member 5-A in the two positions;
the axis "X" of the rotating shaft in the two corresponding positions;
the mechanical connections 53, 54, in the two corresponding positions, in which the position of maximum distance defined above is identified with: 53, 53A and 54, 54A, respectively;
the connecting pole 50, in the two corresponding positions 50 and 50A;
and finally the relative ramp, that here for greater convenience will be identified in the two corresponding positions 71 and 72.

Since it is desired that the tip 11-P of the ramp 71-72 maintain a constant and definite height H1 with respect to the underlying groove, it will be sufficient to dimension the devices involved so as to achieve such condition.

The operation of the improved apparatus described above is as follows: when the height of the ramps is to be changed, the upper mobile structure is lifted from the fixed structure by known elements of conventional type.

By the effect of such lifting, the mobile structure is moved upward, but with a movement of "parallelogram" type as explained above.

The movement of the upper structure also entrains with it, through the brackets 40, 41, the corresponding rotating shaft 32C, which entrains in turn the mechanical linking elements 54, 53 and the auxiliary shaft 55 interconnected between them.

Since the first linking element 53 is connected, through the pin 52, to the connecting pole 50 which is in turn pivoted at the other end 51 to the lower fixed structure, it follows that the effect of the mechanical connections described, combined with the lifting of the upper structure (side members 5-A and 5-B) causes the lifting of the stem 50.

A comparative examination of the positions of the devices described above, as can be seen in the FIGS. 2A, 3A, 4A, where FIGS. 2A and 4A show the two end positions that can be reached by the upper mobile structure, indicates that lifting of the upper mobile structure causes the lifting of the connecting pole 50, and since this is connected to the pin 51, the lifting of the relative end 52 causes the clockwise rotation of the pole itself 50, and thus, through the connections 53, 54 and the shaft 55, also the rotation of the arm 46-A, 46-B, 46-C, . . . and of the respective ramp 11-1.

However, as the movement of the ramp 11-1 is a complex movement, resulting from the combination of the movement of parallelogram type of the upper mobile structure and of the rotatory movement of the mechanical connections 53, 54, and also of the auxiliary shaft 55 about the shaft 32-C, which is in turn connected to the upper mobile structure, the final effect on the ramp 11-1 is its clockwise rotation which, with a suitable sizing of the devices involved, can generate an increase, with reference to FIG. 12, of the inclination of the ramp from one position 71 to another position 72.

It will also be evident that FIGS. 3A, 4A, 5A, although they illustrate only the three cutting modules that include the three rotating shafts 32A, 32B and 32C, also apply to all the other cutting modules, not shown in the figures, since all the cutting modules are engaged in a manner identical to those of the upper structure, naturally apart from their position with respect to the latter.

All the devices involved can therefore ensure that, with easy applications of geometrical type, the ramp and therefore in particular its upper edge are inclined so as to be at a greater height, thus making it possible to process clusters having stems of different lengths, without resulting in negative consequences:
  on the reciprocal positioning between the ramp and the relative rotating shaft, and thus the relative rotating blade;
  nor on the height of the tip of the ramp itself on the respective raised portion, on which are straddled the clusters of products that are brought there to be intercepted and lifted and finally cut by the relative blade.

The basic objective of the invention is thus easily and effectively achieved: since all the cutting modules are connected and supported by the two side members 5-A and 5-B it is in fact possible, with the elements and manners illustrated above, to adjust in a single and simple operation all the cutting modules, each of them connected with the relative blades and also with the relative ramps. In fact, it will be sufficient to lift or to lower with a single operation the position of the mobile structure, and thus according to the invention also the two side members 5-A and 5-B that are part of it, to achieve the basic objective of the invention of being capable of adjusting, in a single operation, not only the inclination of all the ramps of all the cutting modules supported by the mobile structure, but also all the rotating shafts and the relative blades.

It will be evident to a person skilled in the field that the devices and the lifting/lowering modes and the relative control of the mobile structure are methods completely within the area of expertise of the person, and therefore they will not be specified further.

Finally, with reference to FIGS. 7A and 10, it has been found suitable and advantageous that each of the ramps 11-1, 12-1, 13-1, . . . has, on the respective upper edge 11-2, 12-2, 13-2, . . . , a respective groove 11-3, 12-3, 13-3, . . . suitable to accommodate the lower edge of the respective rotating blade 11, 12, 13, . . . .

In fact, this characteristic makes it possible that between the blade itself and the respective upper edge of the respective ramp there will be a corresponding acute angle within which is automatically inserted and pushed the stem to be cut, so that the stem cannot escape by slipping off from under the blade, and so that (see FIG. 10) the cutting angle "t" between the radius "R" that connects the axis "X" of the rotating shaft and the point of virtual interference "C" between the cutting perimeter of the blade 11 and the profile of the respective upper edge 11-2 of the corresponding ramp 11-1 is sufficiently high, and at any rate greater than 90°.

The invention claimed is:
1. Apparatus for the separation of vegetable products, especially cherries, and comprising:
  a fixed and supporting structure with a frame and two parallel horizontal bars which define an inner substantially plane and preferably rectangular surface,
  a plurality of cutting modules, successively arranged over said rectangular surface, each module being provided with a respective rotating shaft having a plurality of rotating blades arranged on a fixed position along its length, said shafts being parallel and mounted above a conveyor configured to carry the products, placed on them, towards said rotating blades,
  a plurality of positioning ramps mounted in correspondence of a respective rotating blade,
  said ramps showing a prolonged shape into the motion direction of said conveyor, and remarkably flattened and vertically oriented,
  whose respective prolonged upper edge is oriented downwards and towards said conveyor, with such an inclination that the height of said edges is increasing in the progression motion of said conveyor,
  so that a product cluster placed on said conveyor are carried towards said ramps whose respective upper edge determines the intersection point between the respective blade and the stalk of each cluster moved under the respective blade,
  wherein:
  a movable frame is arranged, which includes two substantially parallel bars,
  formed with a like geometry of said supporting structure, overlying it,
  said movable frame being connected to said fixed structure through a plurality of movable arms
  each of them being connected, on an end, to a position in said fixed structure, and on its opposite end, to a respective position of said movable frame, wherein said ends related to the same arm are arranged on different vertical straight lines,
  so in that said movable frame becomes able of being shifted with respect to said fixed structure through a translation motion according to a rotating path, like a parallelogram motion,
  and in that the axis of said rotating shafts are made firm to said movable frame through a support,
  and wherein said movable frame is able of simultaneously removing/approaching the position of said rotating shafts and of related ramps with respect to said fixed structure by impressing to them a translation motion according to a rotating path
wherein
said conveyor comprises a levelled member formed by a plurality of parallel grooves which are substantially orthogonal to said rotating shafts, said grooves being separated to each other by respective relief portions,
wherein said levelled member moves in parallel direction to said grooves and so orthogonal to said rotating shafts, and said ramps are placed in correspondence of respective said groves, and the projection of each of said ramps with respect to one of said grooves is aligned to the same groove.

2. Apparatus according to claim 1, wherein
mechanical joining means are arranged with include, for each cutting module, an articulated pole pivoted, to an end, to a fixed position of said supporting structure, and to the opposite end, to a first mechanical connection which is engaged to an auxiliary shaft, to which a second mechanical connection is engaged, one end of which is provided with a through-hole into which the respective rotating shaft is apt of rotating,
and in that the ramp associated to a respective rotating shaft is engaged, preferably through a respective arm, to the respective auxiliary shaft.

3. Apparatus according to claim 2, wherein said ramps, said mechanical connections, said articulated poles, said auxiliary shaft said support are so sized, positioned and arranged among them that the removing/approaching of said movable frame with respect to said fixed structure causes a translation-rotation shift which draws a like motion to the axes of the rotating shafts, which determine that the ramps related to the same rotating shaft are able of shift on a plane substantially orthogonal to the respective rotation shaft, and with a motion comprising the change of the ramp inclination on the respective groove.

4. Apparatus according to claim 3, wherein the ramps related to the same rotation shaft are apt of moving through such a shift that the tips of respective ramps, oriented in the opposite direction to the motion of sad levelled member do maintain basically the same separation height on the respective groove.

5. Apparatus according to claim 1, wherein each of said ramps does show on the relevant upper edge a respective prolonged cavity able of lodging the lower edge of the respective rotating blade.

6. Apparatus according to claim 2, wherein said ramps, said mechanical connections, said articulated poles, said auxiliary shaft said support are so sized, positioned and arranged among them that the removing/approaching of said movable frame with respect to said fixed structure causes a translation-rotation shift which draws a like motion to the axes of the rotating shafts, which determine that the ramps related to the same rotating shaft are able of shift on a plane substantially orthogonal to the respective rotation shaft, and with a motion comprising the change of the ramp inclination on the respective groove.

7. Apparatus according to claim 2, wherein each of said ramps does show on the relevant upper edge a respective prolonged cavity able of lodging the lower edge of the respective rotating blade.

8. Apparatus according to claim 3, wherein each of said ramps does show on the relevant upper edge a respective prolonged cavity able of lodging the lower edge of the respective rotating blade.

9. Apparatus according to claim 4, wherein each of said ramps does show on the relevant upper edge a respective prolonged cavity able of lodging the lower edge of the respective rotating blade.

* * * * *